United States Patent [19]
Schwerin

[11] 4,329,911
[45] May 18, 1982

[54] HYDRAULIC REGULATING DEVICE FOR A WORKING CYLINDER OF AN AGRICULTURAL VEHICLE

[75] Inventor: Günter Schwerin, Möglingen, Fed. Rep. of Germany

[73] Assignee: Robert Bosch GmbH, Stuttgart, Fed. Rep. of Germany

[21] Appl. No.: 62,897

[22] Filed: Aug. 1, 1979

[30] Foreign Application Priority Data

Aug. 30, 1978 [DE] Fed. Rep. of Germany ....... 2837795

[51] Int. Cl.³ ............................................ F15B 13/042
[52] U.S. Cl. ...................................... 91/387; 91/445; 91/461; 172/7
[58] Field of Search ........................ 91/387, 445, 461; 172/7, 9, 10

[56] References Cited

U.S. PATENT DOCUMENTS 2,750,862 6/1956 Garmager ............................. 172/7

FOREIGN PATENT DOCUMENTS 1276959 9/1968 Fed. Rep. of Germany .......... 172/7

Primary Examiner—Gerald A. Michalsky
Attorney, Agent, or Firm—Michael J. Striker

[57] ABSTRACT

A regulating device for a working cylinder of an agricultural vehicle comprises a directional multiway control valve which controls the flow of a working fluid to the cylinder via a switch valve which is normally biased into its closing position and held in its open position by a pressure difference applied thereto from a throttle arranged in a main control conduit connected to a control fluid pump. One end of the spool of the directional multiway control valve is spring biased into a lowering position and its other end is controlled by a setting cylinder which in turn is controlled by an adjustment pressure having an actual pressure component and a desired pressure component. Means for setting the adjustment pressure includes an adjustable pressure reducing valve connected in series in the main control conduit with an adjustable pressure relief valve, the adjustment means of the latter being controlled by an actual power measuring unit on the vehicle. The variation of the actual and nominal pressure values results in a displacement of the sliding member of the multiway control valve from its neutral position into a new hydraulically balanced condition of the regulating device. The switch valve assumes its blocking position when control fluid pump is inactivated and prevents the unintentional lowering of the load when the control valve is in its lowering position.

7 Claims, 3 Drawing Figures

HYDRAULIC REGULATING DEVICE FOR A WORKING CYLINDER OF AN AGRICULTURAL VEHICLE

BACKGROUND OF THE INVENTION

This invention relates generally to hydraulic systems in agricultural vehicles and more particularly it relates to a hydraulic regulating device for a working cylinder of a hydraulic lifting unit in a farm tractor. The regulating device of this invention includes a working hydraulic circuit for controlling the working cylinder, the circuit being constituted of a working fluid pump, a tank, a directional multiway control valve provided with a sliding spool arranged between a working conduit leading to the working cylinder and the pump, the sliding spool being spring biased to be normally in the lowering position in which the working conduit is connected via a return conduit to the tank, and from the other end is controlled by a hydraulic setting cylinder.

A regulating device of this type is known for example from the German Publication No. 26 34 530 describing a hydraulic sensor coupled to the lower guide rod of a three-point linkage to act hydraulically upon an adjustment device which operates as a sequential controlling unit for controlling via mechanical rods a control spool of a directional multiway valve. The disadvantage of this known regulating device is in the fact that a relatively expensive setting or adjustment unit is necessary and moreover the control circuit has to be provided with two pumps and the linkage engages a purely mechanically operating member for setting the actual pressure values. As a consequence, the prior-art regulating device of this type is relatively expensive. In addition, the complicated processing and conversion of the signals results in a relatively inaccurate mode of operation and the entire system is sensitive to vibrations. The setting unit is designed and adjusted exclusively for the regulating device of this kind and therefore commercially available series produced structural units with sliding spools cannot be applied. This prior art setting unit has a sliding spool provided with a throttle region in the form of a land on the spool and is sensitive to foreign particles. The primary disadvantage of this regulating prior-art device arises, however, from the fact that in the case of failure of the pump which delivers control oil for the setting or adjusting unit, the regulating valve automatically switches over to its lowering position in which the lifting unit unintentionally lowers and may cause an accident.

From the German Publication No. 12 76 959 is known another regulating device for the lifting unit of a farm tractor in which hydraulic means for setting the actual value and the nominal value of the pressure are provided to act hydraulically on one side of the spring biased control spool of a directional multiway valve. It is true that this prior-art device employs only a single control conduit for controlling the directional multiway valve and the signals are processed purely hydraulically. Nonetheless it still has the disadvantage that the two setting means are interconnected by a hydraulically controlled linkage. Due to this hydrostatic processing of signals the resulting regulating device is susceptible to interference and is not much suitable for practical operation.

SUMMARY OF THE INVENTION

It is, therefore, a general object of the present invention to overcome the aforementioned disadvantages.

More particularly, it is an object of the invention to provide an improved hydraulic regulating circuit for a working cylinder in which a purely hydraulic signal processing takes place.

Another object of the invention is to provide such an improved regulating device which can be assembled of commercially available component parts.

An additional object of the invention is to provide such an improved regulating device which is simple in structure and can be readily adjusted to different modes of regulating operation.

A further object of the invention is to provide a regulating device which is insensitive to dirt and other interfering influences such as for example temperature variations and vibrations.

In keeping with these objects and others which will become apparent hereafter, one feature of the invention resides, in a hydraulic regulating device of the aforedescribed type in a combination in which the working hydraulic circuit for the working cylinder is supplemented by a hydraulic control circuit for actuating the setting cylinder, the control circuit including a control fluid pump, a main control conduit, an adjustable pressure reducing valve and an adjustable pressure relief valve arranged in series in the control conduit between the control fluid pump and the tank, and adjustment pressure conduit branching from the main control conduit upstream of the pressure reducing valve and being connected to the setting cylinder to apply thereto an adjusting pressure, the adjusting means of the pressure relief valve being operatively coupled to the output of the working cylinder and the adjusting means of the pressure reducing valve being coupled to the output of the pressure release valve whereby the pressure difference at the output of the pressure reducing valve corresponds to the desired or nominal pressure condition at the working cylinder and the pressure difference at the output of the pressure relief valve corresponds to the actual pressure condition at the working cylinder.

In a further elaboration of this invention, the main control conduit in the hydraulic control circuit includes a throttle arranged upstream of the branch point of the adjusting pressure conduit, and the working hydraulic circuit includes a switching multiway valve arranged in the working conduit between the working cylinder and the directional multiway valve, the switching valve having a movable valve member which is biased by a spring towards its closing position. The pressure difference resulting across the throttle in the main control conduit is applied to respective ends of the movable valve member of the switching valve to displace the member against its biasing spring into an open position when pressure fluid is present in the main control conduit. In this manner it is achieved by a very simple manner that upon the disconnection of the hydraulic control circuit or in the case of a malfunction of the control fluid pump the hydraulic cylinder is blocked and consequently an unintentional drop of the pressure in the working cylinder is effectively prevented.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
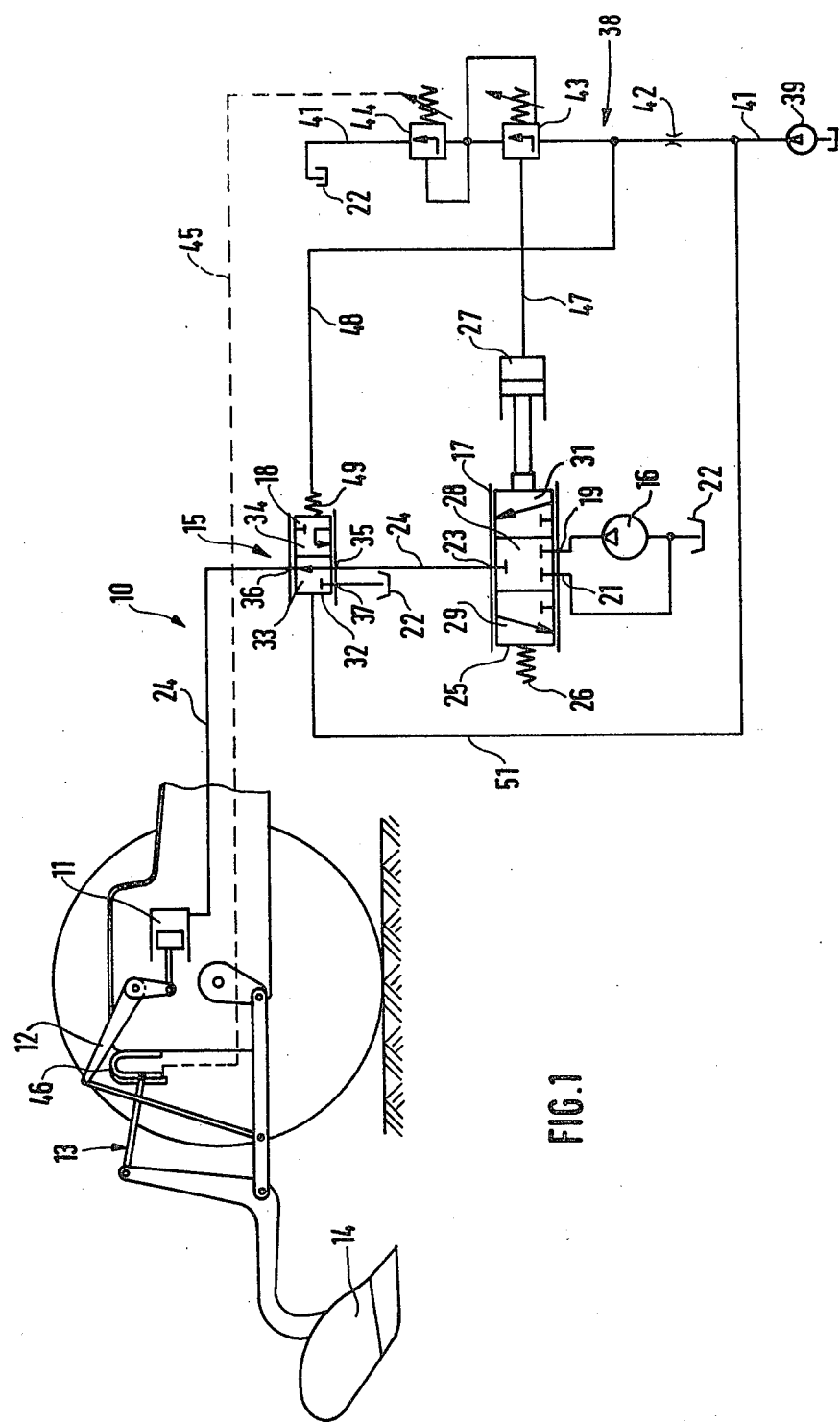
FIG. 1 is a simplified circuit diagram of a hydraulic regulating device for the lifting unit of a farm tractor.

FIG. 1 shows a control or regulating device 10 for the working cylinder 11 of a hydraulic lift unit in a farm tractor. The working cylinder 11 drives via a lift arm 12 a three-point linkage 13 to which a plow 14 is hinged. The working cylinder 11 is connected to a hydraulic working circuit 15 including a working fluid pump 16, a directional multiway valve 17 and a switching valve 18. In this example, the directional multiway valve 17 is formed as a three-way three-position valve provided with an intake port 19 which is connected to the pump 16, a return port 21 connected to the tank 22 and a load port 23 connected via a working conduit 24 to the working cylinder 11 of the lift unit. The switching valve 18 is arranged in the working conduit 24 between the directional control valve 17 and the working cylinder 11. The directional control valve 17 has a sliding member 25, one face of which is biased by a spring 26 in the lowering direction and the other end face of the sliding member is operated by a hydraulic setting cylinder 27. The sliding member 25 is movable from a central or neutral position 28 in which all ports 19, 21 and 23 are blocked into a lowering position in which the load port 23 communicates with the return ports 21, whereas the intake port 19 is blocked, and into a lifting position 31 in which the intake port 19 communicates with the load port 23 and the return port 21 is blocked. The switching valve 18 connected in the working conduit 24 is made as a three-way two-position valve and has a slidable valve member 32 which is movable between a pass-through or open position 33 and a blocking position 34. In the open position 33 the valve member 32 connects its intake port 35 which communicates with the load port 23 of the valve 17, to its outlet port 36 communicating with the working cylinder 11 while its return port 37 communicating with the tank 22 is blocked. In the closing position the intake port 35 communicates with the return port 37 and the outlet port 36 is blocked.

The regulating device 10 further includes a hydraulic control circuit 38 provided with a control fluid pump 39. A control conduit 41 leads from the control fluid pump 39 to the tank 22. A throttle valve 42, an adjustable pressure-reducing valve 43 and an adjustable pressure relief valve 44 are series connected in the control conduit 41 in this order starting from the pump 39. The pressure reducing valve 43 has means for adjusting the pressure difference $\Delta p1$ and serves as a setting member for the desired or nominal pressure value of the regulating device 10. The subsequent pressure limiting or relief valve 44 has also adjusting means operable for setting the pressure difference $\Delta p2$ and serves as a setting member for the actual pressure value of the device 10. The adjusting means of the pressure relief valve 44 is operatively coupled via suitable coupling line 45 to a power measuring unit 46 which is acted upon by the three-point linkage 13. An adjusting pressure conduit 47 connects the pressure reducing valve 43 to the input of the setting cylinder 27. In addition, another conduit 48 branches from the control conduit 41 in the range between the throttle 42 and the intake port of the pressure reducing valve 43 to apply the pressure generated by the throttle 42 to the end face of the sliding member 32 of the switching valve 18, that is biased by spring 49 toward the closing or blocking position 34 of the valve member 32. The opposite end face of the sliding member 32 is subject to the control pressure fluid from a second conduit 51 which branches from the main control unit 41 in the range between the pump 39 and the throttle 42.

The operation of the regulating device 10 will now be described with reference to the diagrams of FIGS. 2 and 3. It is assumed that the sliding member 25 of the directional control valve 17 is in its illustrated neutral position 28 in which the forces acting on respective ends of the sliding member 25 from the biasing spring 26 and the setting cylinder 27 are kept in balance. A steady flow of control fluid is delivered by pump 39 through the control conduit 41 into the tank 22. This flow generates in the throttle 42 a pressure drop or a pressure difference which is applied via conduits 48 and 51 to the end faces of sliding member 32 of the switch valve and keep the latter against the force of the biasing spring 49 in its pass-through or open position 33. In addition the pressure reducing valve 43 generates a first pressure difference $\Delta p1$ and the pressure relief valve 44 generates a second pressure difference $\Delta p2$ the sum of which constitutes the adjusting pressure $\Delta p1 + \Delta p2$ which is applied via the conduit 47 to the setting cylinder 27.

In the illustrated neutral position 28 of the sliding member 25 of the valve 17, the adjusting pressure has a constant magnitude; the components of this adjusting pressure, namely the two pressure differences $\Delta p1$ and $\Delta p2$ however are arbitrarily variable. If the first pressure difference $\Delta p1$ to which the desired or nominal pressure value of the device 10 is assigned, takes a low value, then the second pressure difference $\Delta p2$ to which the actual pressure value is assigned takes a high value. In the reversed case when the nominal value is high the complementary actual value is low.

Figure 2:
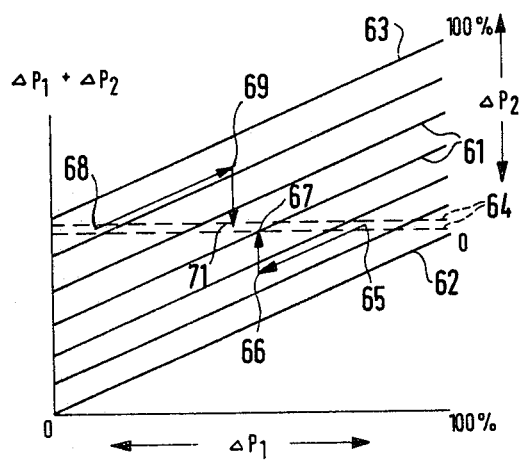
FIG. 2 is a plot diagram showing the dependency of the adjusting pressure which is applied to the setting cylinder for the directional multiway valve, on the pressure difference at the means for setting the nominal pressure value, and showing also the relationships during the variation of the nominal value.

FIG. 2 shows a diagram in which the adjusting pressure consisting of the sum of the first pressure difference $\Delta p1$ and the second pressure difference $\Delta p2$ is plotted on the ordinate whereas the percentage from zero to 100% of the first pressure difference $\Delta p1$ is plotted on the abscissa. The set of inclined straight lines 61 in the diagram indicates the relationship between the nominal value and the adjusting pressure at a set of constant actual values. In other words, the lowermost inclined straight line 62 indicates a zero percentage of the actual pressure value in the adjusting pressure, whereas the uppermost inclined straight line 63 indicates 100% actual value component. The vertical clearance between the lowermost inclined line 62 and the uppermost inclined line 63 thus indicates the interval between 0% and 100% component of the actual value, that is of the second pressure difference $\Delta p2$. The two lines 64 extending parallel to the abscissa and illustrated in dashed lines delimits a so-called neutral range of the directional multiway valve 17.

In the following description the operation of the regulating device 10 will now be explained by way of four examples of working conditions of the device 10 whereby it will be always assumed that the balanced condition of the sliding member 25 as illustrated in FIG. 1 takes place, that means that the sliding member 25 in its neutral position 28 blocks the delivery from the working fluid pump 16 both from the return port 21 and from the load port 23.

In the first example this balanced condition is represented by point 65 in the diagram of FIG. 2. Now if the desired or nominal value is changed in the lowering direction of the plow, that means in the direction of the increased traction or pulling force of the tractor, the first pressure difference $\Delta p1$ is thereby lowered. At an unchanged actual value the adjustment pressure thus momentarily drops to a value designated by the point 66 in FIG. 2 and consequently the sliding member 25 of valve 17 is urged by the spring 26 into its lowering position 29. The pressure fluid from the working cylinder 11 of the lift unit starts flowing back via the conduit 24 and the multiway valve 17 into the tank 22. As a result, the plow 14 is lowered deeper into the soil whereby the forces acting thereon are increased. The power measuring unit 46 signals via the link 45 an increasing actual value to the adjusting member of the pressure relief valve 44 which in turn increases the second pressure difference $\Delta p2$ so long until the adjustment pressure $\Delta p1 + \Delta p2$ attains a constant magnitude determined by the spring 26, and the multiway valve 17 is moved into its neutral position 28. The regulating device 10 is thus brought into a hydraulically balanced condition which is indicated by point 67 in FIG. 2. In this new balanced position 67 the nominal or desired pressure value is in comparison to the starting point 65 substantially lowered and the actual value is correspondingly increased.

In the second case the pressure adjusting operation starts at the balanced position of the device 10 which is indicated by the point 68 in FIG. 2. If the nominal value $\Delta p1$ on the pressure reducing valve 43 is increased, then at an unchanged actual value $\Delta p2$ the adjustment pressure starts increasing to the point 69 in FIG. 2. This increased adjusting pressure moves the sliding member 25 of valve 17 against the force of spring 26 into its lifting position 31. In this position the pump 16 delivers the working pressure fluid via the directional multiway valve 17 and the conduit 24 to the working cylinder 11 of the lifting unit which in turn lifts via the three-point linkage 13 the plow 14 from the soil. At the same time the power measuring unit 46 transmits the indication of the decrease of the actual value of the working pressure fluid to the adjusting member of the pressure release valve 44 and due to the raising of the plow 14 the second pressure difference $\Delta p2$ decreases so long until the adjustment pressure $\Delta p1 + \Delta p2$ attains again a constant magnitude defined by the spring 26 and at which the sliding member 25 of the valve 17 resumes its neutral position 28. This new balanced position of the device 10 is indicated by the point 71 in the diagram of FIG. 2.

Figure 3:
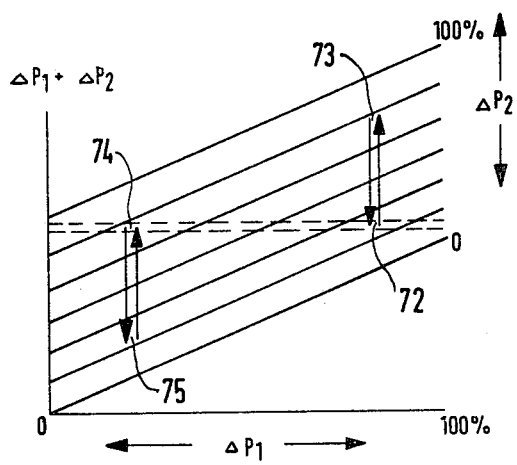
FIG. 3 is a diagram similar to that in FIG. 2 showing the condition in the case of the variation of the actual pressure value.

FIG. 3 shows a diagram in which the same values as in FIG. 2 are plotted on the abscissa and the ordinate. Whereas FIG. 2 represents two cases in which the desired or nominal value of the working pressure is varied, the diagram of FIG. 3 shows a third and a fourth case in which the actual value is changed. In the third case the operation starts again from the balanced condition of the device 10 as illustrated in FIG. 1 and this condition is represented in FIG. 3 by the point 72. If at an unchanged actual value of the working pressure the plow 14 encounters a heavy soil, the pull or traction force increases. The power measuring unit 46 signals the increase of the actual value via the coupling line 45 to the adjustment means of the pressure relief valve 44 and adjusts the second pressure difference $\Delta p2$ in the increasing direction. The resulting increase of the adjustment pressure $\Delta p1 + \Delta p2$ which in FIG. 3 is represented by the point 73, displaces the sliding member 25 of the multiway valve 17 into its lifting position 31. The working pressure fluid from the pump 16 flows to the working cylinder 11 of the lifting unit and the plow 14 is raised. The lifting movement of the plow 14 takes place so long until the traction force acting on the latter is reduced to such an extent that the actual value at the point 72 attains its original magnitude and the directional multiway valve 17 assumes its neutral position 28.

In the fourth case the working pressure regulation is started from the balanced condition of the device 10 which is illustrated by the point 74 in FIG. 3. If at an unchanged nominal value $\Delta p1$ at the pressure reducing valve 43 the plow 14 encounters a lighter soil, the traction force decreases. The power measuring unit 46 readjusts via the link 45 the adjusting means of the pressure release valve 44 and in doing so the second pressure difference p2 is reduced in accordance with the decreasing traction force. As a result the adjusting pressure $\Delta p1 + \Delta p2$ decreases as far as to the point 75 in FIG. 3 and this decrease results in turn in the displacement of the sliding member 25 of valve 17 into its lowering position 29. The working pressure fluid now escapes from the working cylinder 11 of the lifting unit via the conduit 24 and the valve 17 into the tank and consequently the plow 14 is lowered deeper into the soil. This sinking movement of the plow 14 is terminated when the increasing actual value attains again its original magnitude and the regulating device 10 attains its balanced condition indicated by the point 74.

Apart from the above-described four cases which take place during the normal operation of the regulating device 10, the processes occurring during the connection and disconnection of the regulating device 10 are also of importance. During the disconnection of the regulating device the pumps 16 and 39 are also disconnected. As long as the flow of control oil from the pump 39 in the control conduit 41 is larger than zero, the pressure reducing valve 43 and the pressure release valve 44 generate respectively the corresponding pressure differences $\Delta p1$ and $\Delta p2$ and thus safeguard the correct operation of the directional control valve 17. If during the disconnection of the control oil pump 39 the flow of the control oil through the throttle 42 decreases below a predetermined value, the pressure difference generated by the throttle 42 is no longer sufficient for counteracting the spring 49 for keeping the piston member 32 of switch valve 18 in its open position. As a consequence the spring 49 urges the valve member 32 from it pass-through or open position 33 as illustrated in FIG. 1 and displaces the member 32 into its blocking position 34 in which the working cylinder 11 of the lifting unit is hydraulically blocked. If the control oil pump 39 interrupts its delivery, the adjustment pressure $\Delta p1 + \Delta p2$ disappears and consequently the spring 26 urges the sliding member 25 of valve 17 into its lowering position 29 in which the load port 23 communicates with the tank 22. Due to the fact, however, that prior to the disappearance of the adjustment pressure and prior to the displacement of the valve 17 into its lowering position 29 the switch valve 18 has been moved into its blocking position in which the conduit 24 to the working cylinder 11 is blocked, any lowering of plow 14 during the disconnection of the regulating device 10 is reliably prevented.

During the connection of the regulating device 10 the aforedescribed processes taking place during the disconnection of the device occur in reverse order whereby it is important that the pressure reducing valve 43 and the pressure relief valve 44 generate respectively their pressure differences $\Delta p1$ and $\Delta p2$ and thus the adjusting pressure before the switch valve 18 assumes its open position or in other words before the blocking of the working cylinder is removed. In this manner an unintentional lowering of the plow 14 is reliably prevented.

It will be understood that each of the elements described above, or two or more together, may also find a useful application in other types of constructions differing from the types described above.

For example, the regulating device of this invention need not be limited to the shown example for regulating the traction force but it can be employed also for regulating working positions of a tractor or for the combined control thereof. Furthermore, it is also possible without further modifications to use the regulating device of this invention in harvester threshers for regulating the elevation of the mower or reaper plate. The regulating device of this invention can also be designed in such a manner that the pressure reducing valve can operate as the actual value setting means and the subsequently connected pressure relief valve operates as the desired or nominal value setting means. The directional multiway control valve 17 which in this example is illustrated only schematically in a simplified manner can in practice be any suitable commercially available control valve which is in most cases provided with an incorporated switch valve for an intermediate return of the pressure fluid flow from the pump into the tank.

While the invention has been illustrated and described as embodied in a regulating device for use with a farm tractor, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hydraulic control device for a working unit of an agricultural vehicle, preferably for use in connection with a lifting unit of a farm tractor, said device comprising a hydraulic working cylinder, a hydraulic working circuit including a working fluid pump, a tank, a working conduit, a directional multi-way control valve provided with a sliding member, said control valve being arranged in said working conduit between said pump and said working cylinder, spring means for biasing one end of said sliding member into a position in which said working conduit communicates with said tank; a hydraulic setting cylinder for biasing the other end of said sliding member; a hydraulic control circuit for said setting cylinder including a control fluid pump, a main control conduit, an adjustable pressure reducing valve and an adjustable pressure relief valve arranged in series in said control conduit between said control fluid pump and said tank, and an adjustment pressure conduit branching from said main control conduit upstream of said pressure reducing valve and being hydraulically connected to said setting cylinder to apply thereto an adjustment pressure, whereby the pressure difference at one of said adjustable valves indicates the desired condition of said working unit and the pressure difference at the other adjustable valve indicates the actual condition of said working unit.

2. The device as defined in claim 1, wherein said directional multiway control valve defines a neutral position in which said working conduit, said working fluid pump and said tank are disconnected from each other and a lifting position in which said working fluid pump communicates via said working conduit with said working cylinder.

3. The device as defined in claim 1, further comprising a throttle arranged in said main control conduit upstream of the branch point of said adjusting pressure conduit, a switching multiway valve arranged in said working conduit between said working cylinder and said directional control valve and having a movable member displaceable between an open position opening said working conduit and a blocking position closing said working conduit, a biasing spring for urging said movable member of said switch valve into its closed position, and conduit means connected to respective ends of said movable member of said switch valve to apply thereto the pressure difference resulting on said throttle, thus displacing said movable member against the force of said biasing spring to keep said movable member in its open position when pressure fluid is present in said main control conduit.

4. The device as defined in claim 3, wherein said throttle is arranged in said main control conduit upstream of said pressure reducing valve.

5. The device as defined in claim 3, wherein said multiway switch valve is a three-way two-position valve biased by said spring in the direction of its blocking position in which its movable valve member blocks the working conduit leading to the working cylinder when no pressure fluid is delivered by said control fluid pump.

6. The device as defined in claim 1, further including means for feeding the indication of the actual value of a load to one of said adjustable valves.

7. The device as defined in claim 1, further including means for measuring the actual condition of said working unit, and one of said adjustable valves having adjusting means controlled by said measuring means.

* * * * *